United States Patent
Ross

(10) Patent No.: US 9,633,134 B2
(45) Date of Patent: Apr. 25, 2017

(54) TIMELINE WRINKLING SYSTEM AND METHOD

(71) Applicant: FireEye, Inc., Milpitas, CA (US)

(72) Inventor: David Ross, Bowie, MD (US)

(73) Assignee: FireEye, Inc., Milpitas, CA (US)

( * ) Notice: Subject to any disclaimer, the term of this patent is extended or adjusted under 35 U.S.C. 154(b) by 155 days.

(21) Appl. No.: 14/034,672

(22) Filed: Sep. 24, 2013

(65) Prior Publication Data

US 2014/0181131 A1    Jun. 26, 2014

Related U.S. Application Data

(60) Provisional application No. 61/746,019, filed on Dec. 26, 2012.

(51) Int. Cl.
G06F 17/30    (2006.01)

(52) U.S. Cl.
CPC ............... G06F 17/30905 (2013.01)

(58) Field of Classification Search
None
See application file for complete search history.

(56) References Cited

U.S. PATENT DOCUMENTS

| | | | |
|---|---|---|---|
| 7,937,387 B2 | 5/2011 | Frazier et al. | |
| 8,069,484 B2 | 11/2011 | McMillan et al. | |
| 8,566,476 B2 | 10/2013 | Shiffer et al. | |
| 8,650,209 B1 * | 2/2014 | Shattah et al. | 707/770 |
| 8,713,681 B2 | 4/2014 | Silberman et al. | |
| 8,793,278 B2 | 7/2014 | Frazier et al. | |
| 8,881,271 B2 | 11/2014 | Butler, II | |
| 8,949,257 B2 | 2/2015 | Shiffer et al. | |
| 9,106,630 B2 | 8/2015 | Frazier et al. | |
| 9,268,936 B2 | 2/2016 | Butler | |
| 9,275,229 B2 | 3/2016 | LeMasters | |
| 9,413,781 B2 | 8/2016 | Cunningham et al. | |
| 2008/0184367 A1 | 7/2008 | McMillan et al. | |
| 2009/0198651 A1 | 8/2009 | Shiffer et al. | |
| 2009/0198670 A1 | 8/2009 | Shiffer et al. | |
| 2009/0198689 A1 | 8/2009 | Frazier et al. | |
| 2009/0199274 A1 | 8/2009 | Frazier et al. | |

(Continued)

FOREIGN PATENT DOCUMENTS

| | | | |
|---|---|---|---|
| KR | 10-2012-0065819 A | 6/2012 |
| KR | 10-2012-0086926 A | 8/2012 |

OTHER PUBLICATIONS

International Search Report corresponding to PCT/US2013/077822 dated Apr. 28, 2014.
EP 13867490.8 filed Jul. 24, 2015 Extended European Search Report dated Jul. 6, 2016.

*Primary Examiner* — Hung Q Pham
(74) *Attorney, Agent, or Firm* — Rutan & Tucker, LLP

(57) ABSTRACT

A method for organizing event data by identifying a primary timeline containing event data, extracting a first timestamp from a first item of the primary timeline, setting a radius around the first timestamp, identifying a second timestamp within the radius, determining whether the second timestamp is already in a wrinkle timeline, and, if not, incorporating the second timestamp into the wrinkle timeline. Event data associated with the first item may be marked and emphasized in the wrinkle timeline. The system may also create one or more indexes of the event data.

26 Claims, 3 Drawing Sheets

(56) References Cited

U.S. PATENT DOCUMENTS

| | | |
|---|---|---|
| 2010/0017359 A1 | 1/2010 | Kiernan et al. |
| 2010/0030996 A1 | 2/2010 | Butler, II |
| 2011/0099635 A1 | 4/2011 | Silberman et al. |
| 2011/0153748 A1 | 6/2011 | Lee et al. |
| 2011/0173213 A1 | 7/2011 | Frazier et al. |
| 2012/0079596 A1 | 3/2012 | Thomas et al. |
| 2012/0136921 A1* | 5/2012 | Samdadiya et al. .......... 709/203 |
| 2013/0247186 A1 | 9/2013 | LeMasters |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0344926 A1 | 11/2014 | Cunningham et al. |
| 2014/0359771 A1* | 12/2014 | Dash et al. ..................... 726/23 |
| 2016/0044000 A1 | 2/2016 | Cunningham |

\* cited by examiner

Fig. 2

Previous .. Next (31 - of 1,299 Results

| | Type | Field | Date/Time | | Summary Row Data | Mdd5sum | Username |
|---|---|---|---|---|---|---|---|
| ○ Σ | FileItem | FilenameAccessed | 2010-06-25 13:28:20Z | ● | @store.ides[2].txt | C:\Documents and Settings\john.doe1@store.ides[2].txt \Cookies\ | f44f5a9c16b8bc4770000a4c9c28b8e9 |
| ○ Σ | FileItem | FilenameChanged | 2010-06-25 13:28:20Z | ● | @store.ides[2].txt | C:\Documents and Settings\john.doe1@store.ides[2].txt \Cookies\ | f44f5a9c16b8bc4770000a4c9c28b8e9 |
| ○ Σ | FileItem | FilenameModified | 2010-06-25 13:28:20Z | ● | @store.ides[2].txt | C:\Documents and Settings\john.doe1@store.ides[2].txt \Cookies\ | f44f5a9c16b8bc4770000a4c9c28b8e9 |
| ○ Σ | FileItem | Modified | 2010-06-25 13:28:20Z | ● | @store.ides[2].txt | C:\Documents and Settings\john.doe1@store.ides[2].txt \Cookies\ | f44f5a9c16b8bc4770000a4c9c28b8e9 |
| ● Σ | FileItem | Created | 2010-06-25 13:29:05Z | ● | install.exe | C:\RECYCLER\install.exe | 75bd8c6e8934005
6b0000ce64c5f630d |
| ● Σ | FileItem | FilenameCreated | 2010-06-25 13:29:05Z | ● | install.exe | C:\RECYCLER\install.exe | 75bd8c6e8934005
6b0000ce64c5f630d |
| ● Σ | FileItem | FilenameChanged | 2010-06-25 13:29:05Z | ● | install.exe | C:\RECYCLER\install.exe | 75bd8c6e8934005
6b0000ce64c5f630d |
| ● Σ | FileItem | FilenameModified | 2010-06-25 13:29:05Z | ● | install.exe | C:\RECYCLER\install.exe | 75bd8c6e8934005
6b0000ce64c5f630d |
| ● Σ | FileItem | Modified | 2010-06-25 13:29:06Z | ● | install.exe | C:\RECYCLER\install.exe | 75bd8c6e8934005
6b0000ce64c5f630d |
| ○ Σ | FileItem | Created | 2010-06-25 13:29:12Z | ● | psexec.exe | C:\RECYCLER\psexec.exe | 5abb1ccd2a7d8cbccfee71f000c41b15 |
| ○ Σ | FileItem | FilenameAccessed | 2010-06-25 13:29:12Z | ● | psexec.exe | C:\RECYCLER\psexec.exe | 5abb1ccd2a7d8cbccfee71f000c41b15 |
| ○ Σ | FileItem | FilenameChanged | 2010-06-25 13:29:12Z | ● | psexec.exe | C:\RECYCLER\psexec.exe | 5abb1ccd2a7d8cbccfee71f000c41b15 |
| ○ Σ | FileItem | FilenameCreated | 2010-06-25 13:29:12Z | ● | psexec.exe | C:\RECYCLER\psexec.exe | 5abb1ccd2a7d8cbccfee71f000c41b15 |
| ○ Σ | FileItem | FilenameModified | 2010-06-25 13:29:12Z | ● | psexec.exe | C:\RECYCLER\psexec.exe | 5abb1ccd2a7d8cbccfee71f000c41b15 |
| ○ Σ | FileItem | Changed | 2010-06-25 13:29:17Z | ● | psexec.exe | C:\RECYCLER\psexec.exe | 5abb1ccd2a7d8cbccfee71f000c41b15 |
| ○ Σ | FileItem | Modified | 2010-06-25 13:29:17Z | ● | psexec.exe | C:\RECYCLER\psexec.exe | 5abb1ccd2a7d8cbccfee71f000c41b15 |
| ○ Σ | FileItem | FilenameModified | 2010-06-25 13:29:29Z | ● | mswrd8.wpc | C:\Program Files\Windows NT\Accessories\mswrd8.wpc | 746670d25af063abcc5050000ec67c57 |
| ○ Σ | FileItem | Modified | 2010-06-25 13:30:29Z | ● | mswrd8.wpc | C:\Program Files\Windows NT\Accessories\mswrd8.wpc | 746670d25af063abcc5050000ec67c57 |
| ○ Σ | FileItem | Changed | 2010-06-25 13:30:43Z | ● | | C:\Documents and Settings\\Application Data\Adobe \Acrobat\9.0\Forms | |

*Fig. 3*

Wrinkling on: install.exe

| | Field | Date/Time | |
|---|---|---|---|
| ☐ | Accessed | 2010-07-07 15:38:10Z | (+-) [1 ▶] Minutes |
| ☑ | Changed | 2010-07-07 17:14:51Z | (+-) [3 ▶] Minutes |
| ☑ | Created | 2010-06-25 13:29:05Z | (+-) [5 ▶] Minutes |
| ☐ | Filenameaccessed | 2010-07-07 15:38:10Z | (+-) [1 ▶] Minutes |
| ☑ | FilenameChanged | 2010-06-25 13:29:05Z | (+-) [1 ▶] Minutes |
| ☑ | FilenameCreated | 2010-06-25 13:29:05Z | (+-) [5 ▶] Minutes |
| ☑ | FilenameModified | 2010-06-25 13:29:05Z | (+-) [1 ▶] Minutes |
| ☐ | Modified | 2010-06-25 13:29:05Z | (+-) [1 ▶] Minutes |

[Wrinkle]

TIMELINE WRINKLING SYSTEM AND METHOD

CROSS-REFERENCE TO RELATED APPLICATION

This patent application claims priority to U.S. Patent Application Ser. No. 61/746,019 filed Dec. 26, 2012, and titled Timeline Wrinkling, the entire contents of which is incorporated herein by reference in its entirety.

BACKGROUND

1. Field

The present inventive concept pertains to a system and method of conducting a forensic investigation on a computer system following an incident. The present inventive concept more particularly concerns an improved system and method for organizing and manipulating recorded event data and generating a wrinkle timeline report for display to computer forensics investigators.

2. Discussion of Related Art

As more businesses and governmental entities increasingly rely on computer networks to conduct their operations and store relevant data, security of these networks has become increasingly important. The need for increased security is emphasized when these networks are connected to non-secure networks such as the Internet. The preservation of important data and the ability to retrieve and analyze the data in the aftermath of a security breach or incident has become a major focus of forensic investigators.

Various technologies may be employed to aid in the processing and organizing of data, including search technologies, software that copies the entire contents of the hard drive in a computer system, and software that allows an analyst to review its contents and categorize it based on their observations. Certain of the data stored in computer memory that may be of interest to forensic investigators may be found in log files or timelines, that is, files that contain records of the activities of a computer system as lists of data entries specifying, without limitation, the date/time of events occurring in or in connection with the computer system along with each associated event source (an event source may be a software program which is modified in the computer system thus giving rise to a data entry, such as a timestamp, showing the date/time of the modification and the name of the program).

This sort of log file or timeline analysis may be conducted to determine how a computer system has changed over time. This is helpful in finding indicators of a security breach or determining exactly what has changed when a security breach has occurred so that the changes may be corrected. For example, during a computer security incident, looking at file modification dates in line with the dates and times for various system log entries can help create a picture of the activity an attacker may have engaged in while on a system. Existing methods of examining such data are slow and cumbersome, with the majority relying on finding a particular log entry and "walking" forward and backward in the log file or timeline looking for other entries that might be relevant.

Thus there exists a need for additional technologies to analyze and manipulate event data and display same in a fashion that increases efficiency of investigation, controls costs and reduces time spent on analysis.

SUMMARY

In response to aforementioned needs, the present application describes a method and system for organizing and manipulating recorded event data and generating a wrinkle timeline report for display to and use by computer forensics investigators.

In accordance with an aspect of the present inventive concept, data can be organized and presented following an event by identifying a primary timeline containing event data including a first timestamp, choosing a radius for the first timestamp, searching for other event data within the radius of the first timestamp, and/or generating a wrinkle timeline incorporating at least a portion of or all event data, e.g., identified event data.

The first timestamp may, in certain embodiments, be identified and used because of its association with a first item that is of interest to the investigator. For example, if the item "install.exe" is of interest to an investigator, he may choose event data for an "Access[ ]" event of "install.exe" logged at a certain date and time as the first timestamp. The first timestamp may, in certain embodiments, be identified via a search using parameters corresponding with one or more desired characteristics of the event data. An example of a characteristic includes but is not limited to a type of timestamp and/or a type of item.

"Event data" as used herein means data associated with an event, e.g., a primary timeline entry for an event recorded by a computer system, a date/time for the event, and/or the like. An "item" as used herein refers to an event source for which event data is stored. For example, if running, accessing, or initializing "install.exe" causes timestamp event data to be recorded and stored, then "install.exe" is considered to be an "item." Each item may have several different types of event data, such as one or more different timestamps associated with it in a primary timeline. A "primary timeline" is a graphical representation of event data, such as that extracted from one or more computer log files, external memory device(s), and/or other like sources configured to contain, store, and/or track data. An "association" as used herein refers to an identifiable relationship or connection. For example, a relationship between an item and a date/time data entry can typically be identified from an event data describing both. Using such a date/time, an investigator is able to make determinations regarding, for example, when one or more items were accessed, used, modified, and/or otherwise manipulated.

The radius is preferably defined in minutes, thus the investigator may search the primary timeline for event data having time fields within a predetermined number of minutes of the first timestamp, e.g., within any number of minutes. It is foreseen that the radius may be determined using any type and/or combination of measurable units without deviating from the scope of the present inventive concept, e.g., seconds, minutes, hours, days, weeks, months, years, decades, and/or centuries.

Further, the event data incorporated into the wrinkle timeline might include a second timestamp identified in the search step of the method, a second item associated with the second timestamp, and/or additional event data associated with the second item. The second timestamp may be identified using one or more characteristics selected by default settings of a computing device involved in performance of one or more steps of the method, or may be manually selected by a user; the selected characteristics may include a type of timestamp (e.g., Accessed, Modified, Deleted, Compile Time), a type of item associated with a timestamp (e.g., a type of item, such as a process or program), or other characteristics of the timestamp and/or associated item. The method may further include the step of determining whether event data to be incorporated into the wrinkle timeline is already in the wrinkle timeline, to avoid duplicative entry of event data into the wrinkle timeline. A wrinkle timeline may also be structured or formatted so as to incorporate substantially similar settings of a primary timeline on which it is based, or of another timeline. These settings may include visual styling (such as highlighting item(s) of a specific type) or filters (such as those that omit items where certain criteria are or are not satisfied). These settings may be incorporated into the wrinkle timeline so that some or most of its characteristics (such as functionality, data population, display characteristics, etc.) resemble those of the primary timeline. An investigator in certain embodiments may select event data from the primary timeline to incorporate into the wrinkle timeline, and/or select event data in the wrinkle timeline to remove or emphasize.

The event data of a wrinkle timeline may also be indexed for ease of reference and search. Such an index may be structured substantially similarly to an index maintained in relation to a primary timeline on which it is based, or to another timeline. This may help the event data of the wrinkle timeline behave in a similar fashion as if it were in the primary timeline. The index may, for example, be structured around individual timestamps or content-specific features of items in the wrinkled timeline such as event log item event codes.

In certain embodiments, event data of the primary timeline will be extracted from an external device. For example, an investigator may define a certain timeframe in which data is desired for examination and request that data from an external device. Returned data may be incorporated into the primary timeline for examination and use in generating a wrinkle timeline.

The wrinkle timeline may include the first timestamp and/or the first item, and the method may further include the step of marking or visually emphasizing the first timestamp and/or first item to a viewer to assist the viewer in realizing relationships with other event data in the wrinkle timeline. In addition, event data of the primary timeline which is not incorporated into the wrinkle timeline may nonetheless be represented by a visual marking indicating to the investigator that such event data has been removed or was never incorporated from the primary timeline.

In still another embodiment, an investigator may rely on the wrinkle timeline to build yet another, second, wrinkle timeline using substantially the same techniques used to build the first. While the process may be iterative, and thus perhaps conceptualized similarly to a series of filters in which event data filtered out when creating the first wrinkle timeline would not be available or considered for building the second wrinkle timeline, an investigator may elect to pull event data from the primary timeline or other timelines, along with the first wrinkle timeline, for purposes of constructing the second wrinkle timeline.

Additional aspects, advantages, and utilities of the present inventive concept will be set forth in part in the description which follows and, in part, will be obvious from the description, or may be learned by practice of the present inventive concept.

The foregoing is intended to be illustrative and are not meant in a limiting sense. Many features and subcombinations of the present inventive concept may be made and will be readily evident upon a study of the following specification and accompanying drawings comprising a part thereof. These features and subcombinations may be employed without reference to other features and subcombinations.

BRIEF DESCRIPTION OF THE DRAWINGS

The present inventive concept is described in detail below with reference to the attached drawing figures, wherein:

FIG. 2 is a screen shot depicting event data of a primary timeline identified using the present inventive concept; and FIG. 3 is a screen shot depicting selection of several timestamps and associated radii using the present inventive concept.

Figure 1:
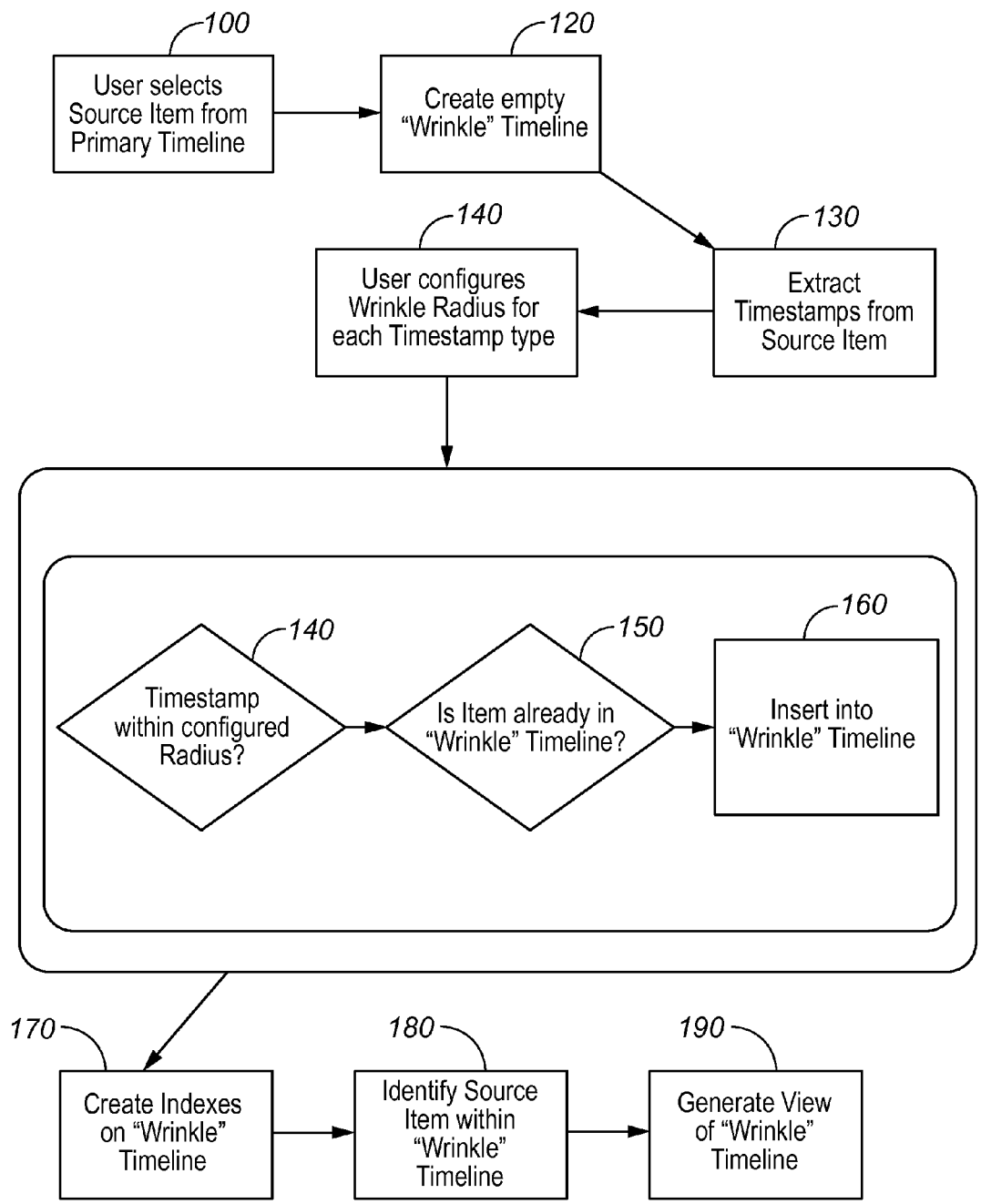
FIG. 1 is a flow chart depicting processing steps of an aspect of the present inventive concept to identify event data along a primary timeline.

The drawing figures do not limit the present inventive concept to the specific examples disclosed and described herein. The drawings are not necessarily to scale, emphasis instead being placed upon clearly illustrating the principles of the present inventive concept.

DETAILED DESCRIPTION

The following detailed description references the accompanying drawings that illustrate the present inventive concept. The illustrations and description are intended to describe aspects of the present inventive concept in sufficient detail to enable those skilled in the art to practice the present inventive concept. Other components can be utilized and changes can be made without departing from the scope of the present inventive concept. The following detailed description is, therefore, not to be taken in a limiting sense. The scope of the present inventive concept is defined only by the appended claims, along with the full scope of equivalents to which such claims are entitled.

In this description, references to "one embodiment," "an embodiment," or "embodiments" mean that the feature or features being referred to are included in at least one aspect of the present inventive concept. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present inventive concept can include a variety of combinations and/or integrations of the embodiments described herein.

The software configured to execute various steps or operations of the present inventive concept may reside on many different hardware configurations which would be known to one skilled in the art. The present application describes a method for organizing, analyzing and displaying event data. Data can be organized and presented according to embodiments of the present inventive concept following an event by identifying a primary timeline containing event data including a first timestamp, choosing a radius for the first timestamp, searching for a subset of event data within the radius of the first timestamp, and/or generating a wrinkle timeline incorporating at least a portion or all of the event data.

Turning now to FIG. 1, steps for generating and displaying a first wrinkle timeline via the present inventive concept are illustrated. The same or at least substantially similar steps may be repeated by the present inventive concept to generate additional wrinkle timelines, e.g., a second wrinkle timeline, from event data of the first wrinkle timeline.

As illustrated FIG. 1, a "Source Item," is selected by a user or investigator from the event data of the Primary Timeline in step 100. The Source Item may be selected by the investigator using one or more computer systems. The shell for the Wrinkle Timeline is then created in step 120. The shell may be created using duplicate settings from the Primary Timeline, but may not initially contain any event data. The duplicate settings may be at least partially or entirely based on data that has been previously stored in a database or memory in communication with and accessibly to the investigator via at least one of the one or more computer systems.

Timestamps, including a first timestamp, of the Source Item are then extracted or identified in step 130, at which point the investigator is presented with the option of setting or selecting a radius or radii for each timestamp by inputting such into the computer system in step 140, which will be further discussed with respect to FIG. 3 hereafter. Then, for each item in the Primary Timeline and for each timestamp associated with each item, steps 140, 150, and 160 are executed via the computer system, which allow the investigator to search for timestamp event data and populate the timeline with such timestamp event data. In step 140, the event data is analyzed to determine if the event data is within one or more of the selected radii and, if so, compared with other similar timestamps, e.g., based on type of timestamp. Any of the event data that is outside all of the selected radii is separately grouped together, e.g., should the investigator elect to conduct any further analysis on the separate group. If the event data is within one or more of the radii, characteristics of such event data, such as item IDs and timestamps, are compared against event data already populating the Wrinkle Timeline in step 150. If such event data is not already in the Wrinkle Timeline, it is inserted into the Wrinkle Timeline in step 160. Because the event data that fell within the radii are associated with various items, and those items are themselves associated with other event data having time field entries that may fall outside of the radii but nonetheless be relevant, e.g., the separately-grouped event data, an investigator may also insert such separately-grouped event data of any items deemed to be relevant into the Wrinkle Timeline via the computer system.

Optionally, so that the investigator might more easily search the Wrinkle Timeline via the computer system, the event data in the Wrinkle Timeline may be indexed according to various schema, e.g., predetermined schema selected by the Investigator. In a preferred embodiment, the index is structured similarly to the index for the Primary Timeline. Still further, a wrinkle timeline may be modifiable to mark or visually or aurally emphasize the first item (the Source Item in FIG. 1) or first timestamp to aid the investigator in identifying or realizing relationships with other event data in the wrinkle timeline. Event data of the primary timeline that is not incorporated into the wrinkle timeline may be marked or visually accounted for in the wrinkle timeline so that the investigator is aware of those gaps. The investigator may rely on the results of the search method in creating a wrinkle timeline, whether by selecting settings for what event data is included in the wrinkle timeline or allowing default settings to do so, and may also manually select event data to exclude or include in the data set incorporated into the wrinkle timeline, or may manually select data in the wrinkle time for exclusion therefrom.

Turning now to FIG. 2, event data of a primary timeline of the present inventive concept is depicted. As is apparent from FIG. 2, there are a number of methods for filtering or modifying display of the event data of a primary timeline via the computer system, for example to simplify the process of choosing a first timestamp and/or first item. Drop down menus depicted in FIG. 2 allow for selection of a timeframe by the investigator in which the event data must fall in order to be included in the primary timeline. The investigator may also select certain types of event data to be included in the primary timeline. Alternatively, some or all of these settings may be used while selecting a first timestamp or first item, but may then be relaxed or disengaged when the search step of the method is reached so that a more comprehensive set of event data may be searched by the investigator using the computer system.

It is foreseen that other units of time, such as seconds, hours, days, weeks, months, years, decades, and/or centuries, or any other like, identifiable and comparable characteristics related to and expressed by event data such as physical distance, e.g., physical distance between stored data in a memory, may be used as radii without departing from the spirit of the present inventive concept. It is foreseen that a combination of different types of radii may be used as well, e.g., time and physical distance of one or more portions of the event data. The investigator may select an appropriate radii depending upon the focus of investigation. For example, smaller units of time may be used when focusing on an efficient investigation of higher resolution network events, or larger units may be used for searches of a larger scope and/or to achieve higher accuracy.

Turning now to FIG. 3, a first item ("install.exe") is depicted with a set of associated timestamps of different types, one of which may be considered the first timestamp. Also depicted are drop down menus allowing the investigator to select a value for a radius for each timestamp. For illustrative purposes, the radii drop down menus of FIG. 3 are measured in minutes. As discussed herein, however, the radii is not limited to such. Generally, during a search for timestamps within, for example, a five minute radius of the first timestamp of the first item, the investigator will look for other event data, such as other timestamps, associated with Date/Time time field entries five minutes before or after the first timestamp.

The investigator may perform the present inventive concept using an agent in certain embodiments. An agent is a module of software installed on a target system that enables a user to monitor and interact with the target system. Agents allow users to gather information about multiple aspects of the target system. Agents also permit users to remotely retrieve the contents of the target system's memory or hard drive, and could potentially be configured to modify its contents. The agent may be configured to either communicate over a computer network, or to read and write all relevant configuration information and acquired data to a computer storage medium, such as a hard drive or removable read/write media (USB key, etc). In one embodiment, the agent is built in a modular fashion. The ability to gather a particular piece of data from a target system (e.g. a list of running processes on the target system or a primary timeline) is implemented as a discrete module of software and loaded by the agent. This allows for easy adaptation of the agent to different environments that have specific requirements for data collection.

The previous description of the presently disclosed inventive concept is provided to enable any person skilled in the art to make or use the present inventive concept. Various modifications will be readily apparent to those skilled in the art, and the generic principles defined herein may be applied alternatively without departing from the spirit or scope of the present inventive concept. Thus, the present inventive concept is not intended to be limited to the description herein but is to be accorded the widest scope consistent with the principles and novel features disclosed herein.

The steps of a method, system, or operation described in connection with the present inventive concept disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art.

Having now described the features, discoveries and principles of the present inventive aspect of this disclosure, the manner in which the present inventive aspect is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the present inventive aspect herein described, and all statements of the scope of the present inventive aspect which, as a matter of language, might be said to fall there between.

What is claimed is:

1. A method of organizing event data using a computer system, the method comprising:
    identifying a first timestamp in a primary timeline, the primary timeline corresponding to a representation of event data obtained from one or more sources;
    searching, via the computer system, for a first subset of the event data within a first radius, the first radius being a selected period of time from the first timestamp;
    generating, via the computer system, a first wrinkle timeline incorporating the first subset of the event data, the first wrinkle timeline being a subset of the primary timeline;
    identifying, via the computer system, a second timestamp within the event data;
    searching, via the computer system, for a second subset of the event data within a second radius, the second radius being a selected period of time from the second timestamp;
    copying the second subset of the event data into the first wrinkle timeline when the second subset of the event data associated with the second timestamp is determined to be absent from the first wrinkle timeline; and
    generating one or more displayable images of the event data associated with the first wrinkle timeline after copying the second subset of the event data,
    wherein the second subset of the event data differing from the first subset of the event data and the first wrinkle timeline including the first subset of the event data before copying the second subset of the event data into the first wrinkle timeline.

2. The method according to claim 1, wherein the searching for the first subset of the event data within the first radius includes identifying one or more timestamp characteristics and comparing the one or more timestamp characteristics to the event data.

3. The method according to claim 1, further comprising:
    identifying a third timestamp within the event data;
    searching for a third subset of the event data within a third radius, the third radius being a selected period of time from the third timestamp; and
    determining whether the third subset of the event data associated with the third timestamp is present in the first wrinkle timeline.

4. The method according to claim 3, wherein,
    copying the third timestamp into the first wrinkle timeline when the third subset of the event data associated with the third timestamp is determined to be absent from the first wrinkle timeline.

5. The method according to claim 1, further comprising:
    creating an index of the first wrinkle timeline including the first subset of the event data and the second subset of the event data.

6. The method according to claim 5, wherein the first wrinkle timeline index is substantially similar to an index associated with the primary timeline.

7. The method of claim 1, wherein the first subset of the event data includes the first timestamp.

8. The method of claim 7, wherein the first timestamp is marked in the first wrinkle timeline.

9. The method of claim 1, wherein the first wrinkle timeline has substantially the same settings as the primary timeline.

10. The method of claim 1, wherein the radius is at least partially defined in minutes.

11. The method of claim 1, further comprising:
    identifying the first timestamp of the primary timeline using a keyword search.

12. The method of claim 1 being conducted using a computing device and the event data of the primary timeline resides in a memory of an external device.

13. The method of claim 1, further comprising:
    creating a visual representation of event data of the primary timeline that is not incorporated into the first wrinkle timeline.

14. The method of claim 1, further comprising:
    identifying a third timestamp in the first wrinkle timeline;
    choosing a radius for the third timestamp;
    searching for one or more event data within the radius; and
    generating a second wrinkle timeline incorporating at least one of the event data.

15. The method of claim 1, wherein the first wrinkle timeline being structured or formatted to include one or more settings of the primary timeline on which the first wrinkle timeline is based.

16. A system comprising:
    a processor; and
    a non-transitory storage medium communicatively coupled to the processor, the storage medium to store software that, upon execution by the processor, performs a plurality of operations including
    identifying a first timestamp in a primary timeline, the primary timeline corresponding to a representation of event data obtained from one or more sources,
    searching for a first subset of the event data within a first radius, the first radius being a selected period of time from the first timestamp,
    generating a first wrinkle timeline incorporating the first subset of the event data, the first wrinkle timeline being a subset of the primary timeline,
    identifying a second timestamp within the event data,
    searching for a second subset of the event data within a second radius, the second radius being a selected period of time from the second timestamp,
    copying the second subset of the event data into the first wrinkle timeline when the second subset of the event data associated with the second timestamp is determined to be absent from the first wrinkle timeline, and
    generating one or more displayable images of the event data associated with the first wrinkle timeline after copying the second subset of the event data,
    wherein the second subset of the event data differing from the first subset of the event data and the first wrinkle timeline including the first subset of the event data before copying the second subset of the event data into the first wrinkle timeline.

17. The system according to claim 16, wherein the searching for the first subset of the event data within the radius conducted by the processor during execution of the software includes identifying one or more timestamp characteristics and comparing the one or more timestamp characteristics to the event data.

18. The system according to claim 16, wherein the software, upon execution by the processor, further performs one or more operations that comprise:
   identifying a third timestamp within the event data;
   searching for a third subset of the event data within a third radius, the third radius being a selected period of time from the third timestamp; and
   determining whether the third subset of the event data associated with the third timestamp is present in the first wrinkle timeline.

19. The system according to claim 18, wherein the software, upon execution by the processor, further copies the third subset of the event data associated with the third timestamp into the first wrinkle timeline in response to the third subset of the event data associated with the third timestamp being determined to be absent from the first wrinkle timeline.

20. The system according to claim 18, wherein the software, upon execution by the processor, further copies the third timestamp into the first wrinkle timeline in response to the third timestamp being determined to be absent from the first wrinkle timeline.

21. The system according to claim 18, wherein the software, upon execution by the processor, further comprises creating an index of the first wrinkle timeline including the first subset of the event data and the second subset of the event data.

22. The system according to claim 16, wherein the first subset of the event data includes the first timestamp.

23. The system of claim 16, wherein the radius is at least partially defined in minutes surrounding the first timestamp.

24. The system of claim 16, wherein the first wrinkle timeline being structured or formatted to include one or more settings of the primary timeline on which the first wrinkle timeline is based.

25. A system comprising:
   a processor; and
   a memory communicatively coupled to the processor, the memory including software that, upon execution by the processor, performs a plurality of operations that comprise
   identifying a first timestamp in a primary timeline, the primary timeline corresponding to a representation of event data obtained from one or more sources;
   searching for a first subset of the event data within a first radius, the first radius being a selected period of time surrounding the first timestamp;
   generating a first wrinkle timeline incorporating the first subset of the event data, the first wrinkle timeline being a subset of the primary timeline;
   identifying a second timestamp within the event data;
   searching for a second subset of the event data within a second radius, the second radius being a selected period of time surrounding the second timestamp;
   copying the second subset of the event data into the first wrinkle timeline when the second subset of the event data associated with the second timestamp is determined to be absent from the first wrinkle timeline, and
   generating one or more displayable images of the event data associated with the first wrinkle timeline after copying the second subset of the event data,
   wherein the second subset of the event data differing from the first subset of the event data and the first wrinkle timeline including the first subset of the event data before copying the second subset of the event data into the first wrinkle timeline.

26. The system of claim 25, wherein the first wrinkle timeline being structured or formatted to include one or more settings of the primary timeline on which the first wrinkle timeline is based.

* * * * *